July 30, 1968  J. R. HENDRICKSON  3,395,388
VEHICLE READ END SIGNAL LIGHT WARNING SYSTEM
Filed May 27, 1965  3 Sheets-Sheet 1

INVENTOR.
Jack R. Hendrickson
BY
William L. Fisher
HIS ATTORNEY

July 30, 1968 J. R. HENDRICKSON 3,395,388
VEHICLE READ END SIGNAL LIGHT WARNING SYSTEM Filed May 27, 1965 3 Sheets-Sheet 2

INVENTOR.
Jack R. Hendrickson
BY
William L. Fisher
HIS ATTORNEY

July 30, 1968   J. R. HENDRICKSON   3,395,388
VEHICLE READ END SIGNAL LIGHT WARNING SYSTEM
Filed May 27, 1965   3 Sheets-Sheet 3
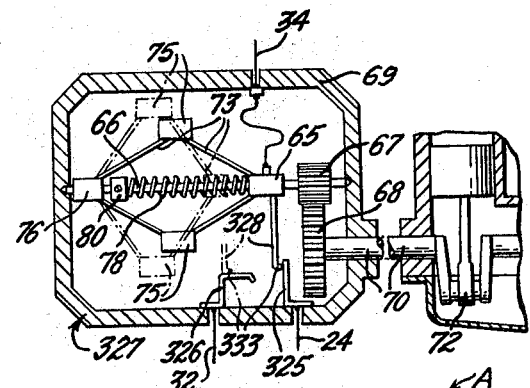
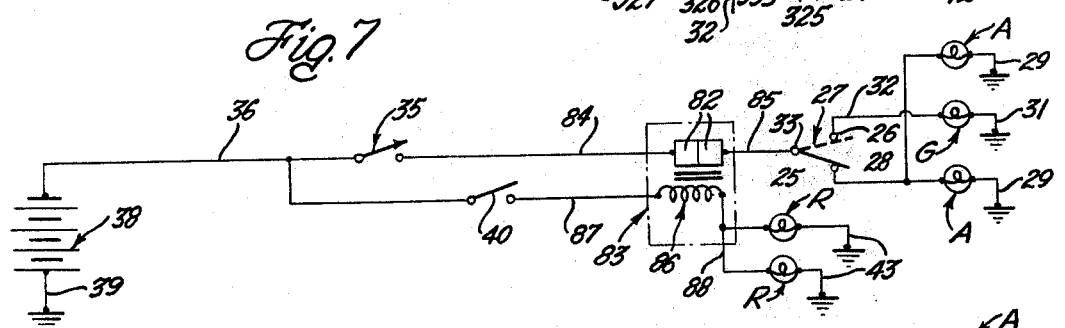
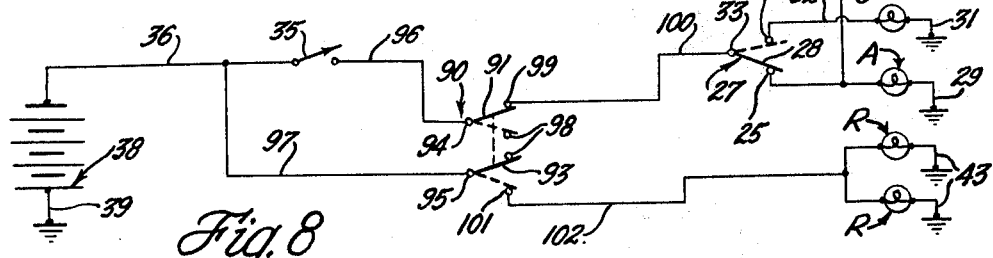
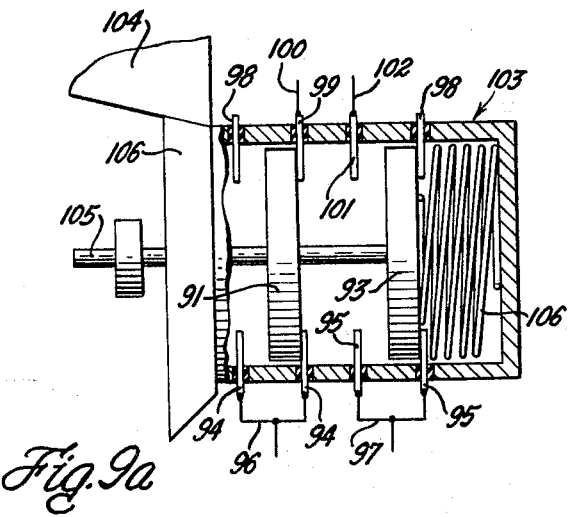
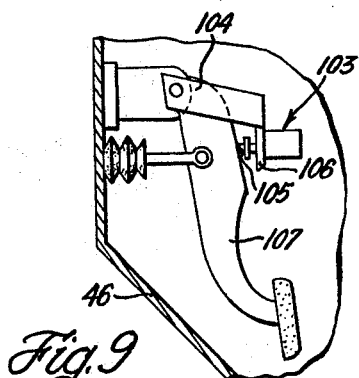
INVENTOR.
Jack R. Hendrickson
BY William L. Fisher
HIS ATTORNEY

United States Patent Office 3,395,388
Patented July 30, 1968

3,395,388
VEHICLE REAR END SIGNAL LIGHT
WARNING SYSTEM
Jack R. Hendrickson, 3665 Burning Tree,
Bloomfield Hills, Mich. 48013
Filed May 27, 1965, Ser. No. 459,277
4 Claims. (Cl. 340—71)

ABSTRACT OF THE DISCLOSURE

Improved vehicle rear end warning means are disclosed for use with an automotive vehicle having a method of warning as to the application of the vehicle's brakes by emitting at least one red brake light. Said means and method comprising an amber and green only warning system characterized by extreme simplicity in that parallel electrical paths are employed in parallel with the vehicle's brake circuit each of which consists of only one type of electrical element. The emission of said green and amber lights is in horizontally disposed separate areas to produce eye movement therebetween for alerting an observer.

---

This invention relates to improvements in automotive vehicle rear end warning means for signaling to trailing vehicles changes in vehicle velocity status.

Prior proposed warning means of this type have not been adopted by automotive vehicle manufacturers because of drawbacks of one sort or another among which are complexity as witness the warning means disclosed in U.S. patents to Stafford No. 2,275,695 and to Danek No. 2,760,113.

The improved vehicle rear end warning means of the present invention is characterized by its extreme simplicity and low cost by which it has appeal to automotive vehicle manufacturers. It can be incorporated as original equipment in new vehicles or sold in the after market for installation on existing vehicles.

The principal object of the present invention is the provision of simplified and entirely practical vehicle rear end warning means which renders an automobile a safer instrument of travel by materially assisting in curbing rear end collisions in traffic. This is particularly significant today in view of the rising injuries and fatalities on America's highways. Recently a high government official who instituted an investigation into traffic safety remarked that the automobile itself "has become increasingly lethal." The vehicle rear end warning means of the present invention signals the idle condition of the vehicle by suitably colored lights visible from the rear of the vehicle and upon a change to underway condition said means signals such change from idle to underway condition by other suitably colored lights at the same eye level. Also during said underway condition said means signals sudden release of the vehicle accelerator by the first-mentioned colored lights.

The foregoing object of the invention and its advantages will become apparent during the course of the following description taken in conjunction with the accompanying drawings in which:

FIGS. 3, 7 and 8 are circuit diagrams of electrical circuit means constituting a part of the present invention;

FIGS. 4, 4A and 5 and 6 are elevational views partly in section of different switch actuating means constituting part of the present invention; and FIGS. 9 and 9A are elevational views partly in section of brake actuated disabling means embodying the invention.

Figure 1:
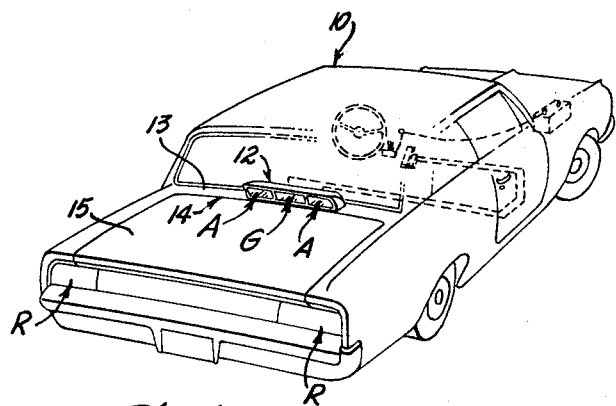
FIG. 1 is a fragmentary perspective view of an automobile equipped with the improved rear end warning means of the present invention.
Figure 1A:
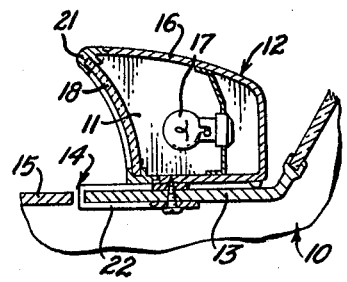
FIGS. 1A, 1B and 2A, 2B are cross-sectional and perspective views, respectively, of the signal housing means shown in FIGS. 1 and 2.
Figure 1B:
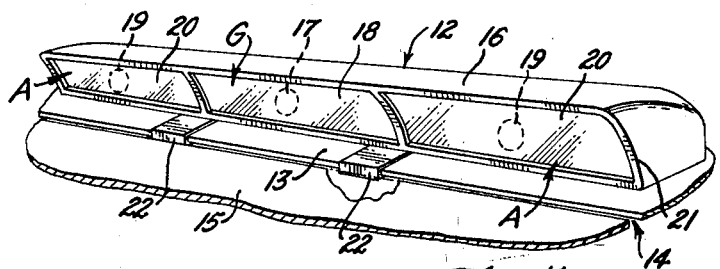

Referring to the drawings in greater detail, 10 designates an automobile which is equipped with the improved automotive vehicle rear end warning means of the present invention which includes signal lamp housing means 12 mounted on the rear deck 13 of the automobile 10 behind the hinge line 14 for the rear deck lid 15.

The housing means 12 comprises a housing member 16 which is closed at its top, bottom, rear and sides and open in the front. The member 16 is compartmented as shown at 11 and each compartment is provided with a socket and bulb so that the light emitted from each lamp is directed out of the respective compartment at the front of the member 16. The bulb 17 together with a green colored lens 18 constitutes a central green signal lamp G. The bulbs 19 which are connected in parallel together with a pair of amber colored lenses 20 constitute outboard amber signal lamps A. The lenses 18 and 20 are mounted together into an assembly by a bezel 21 which affixes to the member 16 and closes off its open front so that the green and amber lights G and A of the housing means 12 are emitted centrally and outboard with respect to each other. Their positions of course can be reversed so that the green lights are outboard in respect to the amber light. Mounting means 22 are affixed to the bottom wall of the member 16 at its front end so that it can slip over the edge of the rear deck 13 at the hinge line 14 to secure the housing means to the automobile 10 so that it faces rearwardly.

Figure 2:
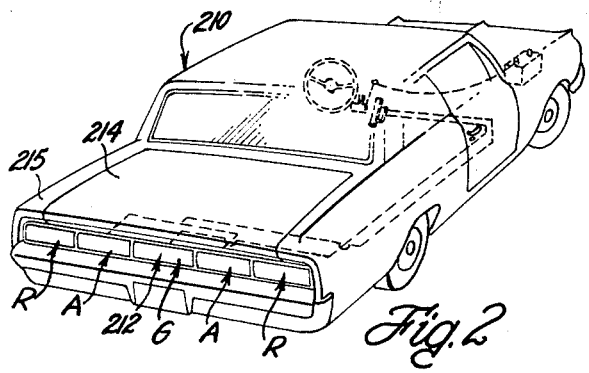
FIG. 2 is a fragmentary perspective view similar to FIG. 1 of an automobile equipped with a different form of signal lamp housing means constituting a part of the present invention.
Figure 2A:
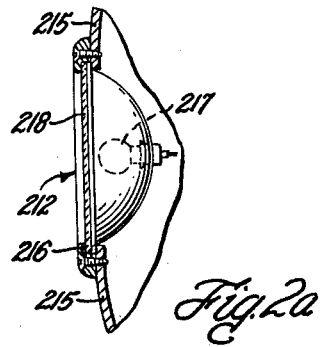
Figure 2B:
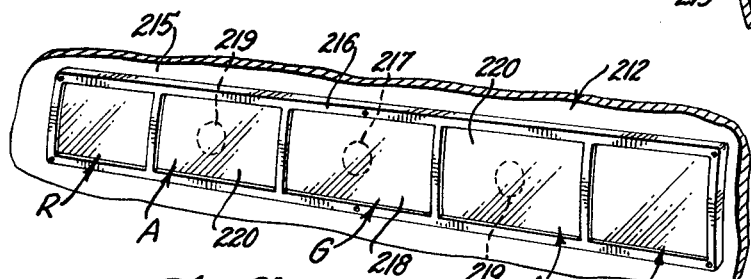

In FIG. 2 the automobile 210 is equipped with a signal lamp housing means 212 which is the subject matter of my copending design patent application S.N. 7,526, filed June 20, 1967. In this form of housing means 212 the principal housing member 216 in the form of a bezel is fitted into the automobile body 215 and beneath the rear deck lid 214 and holds a bulb 217 and lens assembly 218 which has a green colored glass front face and constitutes the central green signal lamp G. The bulbs 219 and separate lens assemblies 220 which have amber colored glass front faces are similarly held in the housing member 216 and constitute the outboard amber signal lamps A. The member 216 holds conventional red stop lamps R outboard of the pair of amber lamps A.

Figure 3:
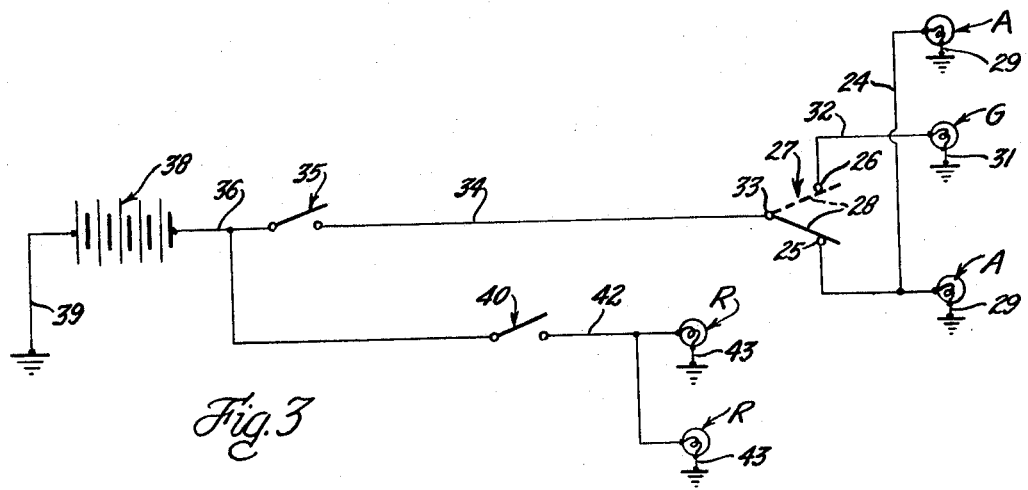

Referring now to the embodiment of electrical circuit means of FIG. 3 one side of the outboard amber signal lamps A are connected by an electrical line 24 to one contact 25 of switch means 27 which is actuated as will be described when the vehicle is accelerated. The other side of the lamps A are individually grounded by the line 529. The central green signal lamp G is connected to ground on one side by the line 31 and on the other side by the line 32 to another contact 26 of the same switch means 27. The switch means 27 in this instance is a single pole double throw type switch, the pole 28 of which is connected via the center switch contact 33 and the line 34 to one side of the vehicle ignition switch 35. The other side of the ignition switch 35 is connected by the line 36 to one side of the vehicle battery 38 the other side of which battery is grounded by the line 39. The switch means 27 has two operational positions corresponding to the throws of its poles. One of these is a normally held position in which the pole 28 is held in engagement with the switch contact or contacts 25. The other position is an actuated position in which the pole 28 is thrown into engagement with the switch contact or contacts 26 by switch actuating means of the present invention to be described. In the normally held position of the switch 27 the amber lamp or lamps A are placed in series with the ignition switch 35 so that whenever the vehicle is under power but not accelerating the amber lamp or lamps A are energized. In the event the vehicle is accelerated the switch means 27 is actuated by the means to be described and its pole 28 thrown to its other operational position to place the green lamp G in series with the ignition switch 35. In FIG. 6 the conventional vehicle brake circuit consisting of the brake actuated stop light switch 40 connected by the line 42 to one side of the normal red stop lights R the other side of which is grounded by the lines 43 is shown connected by the line 36 to the hot side of the ignition switch 35 but it is not utilized or affected by the electrical circuit means shown in FIG. 6.

Figures 4, 4A:
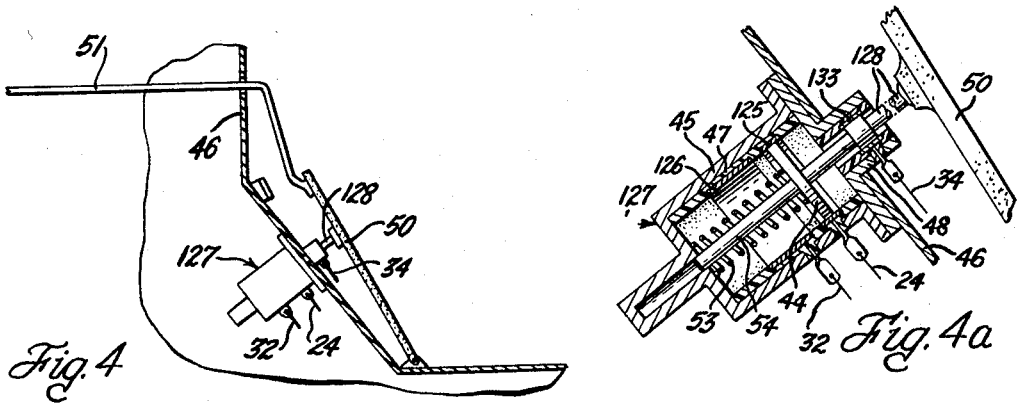

In FIGS. 4 and 4A are shown one form of switch means 27 which comprises a cylinder and piston type switch 127 the pole 128 of which is connected as a piston rod to a piston 44 which is slidably carried in a chamber 45 mounted on the vehicle firewall 46. The chamber 45 is lined with conductive sleeves 125 and 126 electrically connected to external connecting members to which the lines 24 and 32, respectively, are connected. An insulating sleeve 47 of axial length greater than the thickness of the piston 44 separates the sleeves 47 and 48. The pole 128 operates out of the end of the chamber 45 which is mounted on the firewall 46 and through an extension member 50 which carries a conductive sleeve 133 in sliding contact with the pole 128 which sleeve 133 is electrically connected to an external connecting member to which the line 34 is connected. The pole 128 is connected to the accelerator pedal 52 and is urged toward the mounted end of the chamber 45 by a compression spring 53 which is concentrically disposed about a rod 54 projecting from the side of the piston 44 opposite the pole 128. The linkage 51 which interconnects the accelerator pedal 50 with the carburetor butterfly valve (not shown) of course is normally biased toward the passenger compartment by well known means to maintain the pedal 52 in its non-depressed condition. Whenever the accelerator pedal 52 is in its undepressed condition the piston 44 is disposed within the chamber 45 so as to be in contact with the sleeve 125 which places the amber lights A in series with the vehicle ignition switch 35. When the vehicle is underway from depression of the accelerator pedal 50 the piston 44 moves over the insulating sleeve 47 and into contact with the conductive sleeve 126 to place the green lights G in series with the ignition switch 35. Upon sudden release of the accelerator pedal 50 which usually precedes a braking action the piston 44 is returned to its normally held non-depressed position in which it is in electrical contact with the sleeve 125.

Figure 5:
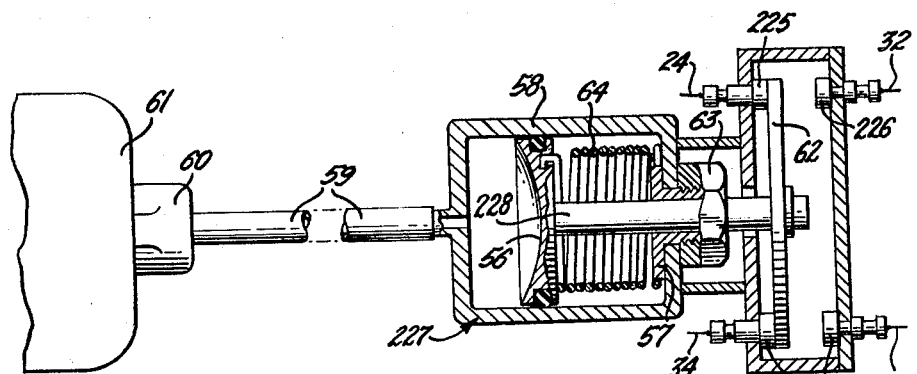

Another form of switch means 27 is shown in FIG. 5 which comprises a cylinder and piston type switch 227 the pole 228 of which is connected as a piston rod to a piston 56 which is slidably carried in a chamber 58 one end of which is connected via the conduit 59 to the intake manifold 60 of the vehicle engine 61. The pole 228 has affixed to it an electrical contact member 62 which engages switch contacts 225 and 233 in the normally held position of the switch 227 which is dependent upon the vacuum in the intake manifold 60 when the vehicle engine is idling which vacuum holds the piston 56 against the urging of a tension spring 64. The spring 64 operates between the other end of the chamber 58 and the rod side of the piston 56, and urges the pole to the right in FIG. 5. The vacuum which is preselected to hold the switch in its normally held position is that created when the vehicle engine is in idle condition. In the normally held position of the switch 227 the amber lamps A are connected in series with the vehicle ignition switch 35. Upon a decrease in vacuum in the intake manifold 60 from acceleration of the vehicle below the preset idle vacuum the spring 64 throws the pole 228 to its other operational position in which the contact member 62 engages switch contacts 233 and 226 to place the green lamp G in series with the ignition switch 35. The nut 63 is capable of moving the plate 57 inwardly of the chamber 58 to decrease the tension upon the spring 65 so as to preselect the vacuum required to hold the pole 228 in the position shown for it in FIG. 5.

FIG. 6 shows still another form of switch means 27 which comprises a governor type switch 327 having a pole 328 connected to a collar 65 which is slidable on shaft 66 rotatably mounted in a housing 69 and carrying a pinion gear 67 which meshes with a gear 68 on a shaft 70 connected to the vehicle crankshaft 72. The slidable collar 65 is connected by links 73 and a pair of weights 75 to a fixed collar 76 which is fast on the shaft 66. The compression spring 78 which is concentrically disposed about the shaft 66 operates upon the collar 65 to hold the pole 328 so that its contact 333 engages switch contact 325 to place the amber lamps A in series with the ignition switch 35. Upon a predetermined increase in the rotational speed of the crankshaft 72 the pole 328 is thrown by the spreading movement of the weights 75 outwardly away from the shaft 66 which pulls the collar 65 and the pole 328 so that the contact 333 on the latter engages switch contact 326 to place the green lamps G in series with the ignition switch 35. The mechanism 80 is adjustable axially of the shaft 66 in preselected fixed positions to vary the compression on the spring 78 so that the predetermined rotational speed at which the pole 328 is thrown is adjustable. The preselected rotational speed at which the contact 333 is maintained engaged with the contact 325 is that corresponding to idle condition of the vehicle engine.

In FIG. 7 a pair of normally closed contacts 82 of an electromagnetic relay 83 is placed in series in the energizing circuit between the ignition switch 35 and the switch means 27 by the lines 84 and 85. The electromagnet 86 of the relay 83 is placed in series in the brake circuit between the stop light switch 40 and the stop lights R by the lines 87 and 88. Energization of the electromagnet 86 upon application of the vehicle brakes opens the contacts 82 to disable the energizing circuit so that the amber signal lamps A will be de-energized at the time that the vehicle brakes are applied. Upon release of the vehicle brakes the electromagnet 86 will be de-energized and the contacts 82 will be closed to reestablish energization of the amber signal lamps A.

Another form of brake actuated disabling means for the energizing circuit is shown in FIG. 8 which comprises switch means 90 in the form of a double pole double throw switch the poles of which are separately connected in the brake light circuit and in the energizing circuit for the warning means of the present invention. The poles of the switch 90 are designated 91 and 93 and are connected to the center switch contacts 94 and 95, respectively, which are in turn connected on opposite sides of the ignition switch 35 by the lines 96 and 97. Switch contacts 98 are unconnected and the switch contact 99 is connected to the switch contact 33 of the switch means 27 by the line 100 while the switch contact 101 is connected to the stop lights R by the line 102. The switch 90 is normally held so that its pole 91 places the switch means 27 in series with the ignition switch 35 and the stop lights R out of circuit until the brake pedal is depressed in which case the poles 91 and 93 are thrown to their opposite operational positions in which the pole 93 places the brake lights R in series with the ignition switch 35 while the energizing circuit for the warning means is disabled thus de-energizing the amber lights A. Release of the brake pedal de-energizes the brake lights R and reestablishes the energizing circuit by connecting the switch means 27 in series with the ignition switch 35. One form of the switch means 90 is shown in FIGS. 9 and 9A in which a housing 103 is affixed to stationary structure 104 mounted on the firewall 54. A plunger 105 is slidably carried in and operates out of one end 106 of the housing 103. The plunger 105 is affixed to the poles 91 and 93 and is biased outwardly of the housing 103 by the compression spring 106 which causes the plunger 105 to follow the movement of the brake pedal supporting arm 107 so that the poles 91 and 93 are held against the urging of the spring 106 by the arm 107 in the positions shown in FIG. 9 so that the switch means 27 is in series with the ignition switch 35 and the stop lights R are de-energized in the unde-pressed position of the brake pedal. When the latter is depressed the plunger 105 follows the arm 107 and throws the poles 91 and 93 to their opposite operational positions in which the energizing circuit is disabled and the stop lights R are energized.

It will thus be seen that there has been provided by the present invention improved automotive vehicle rear end warning means in which the object hereinabove set forth together with many other thoroughly practical advantages has been successfully achieved. Such rear end warning means provides a side by side disposition of electrical signal lamps capable of emitting differently colored lights visible at the same eye level from a trailing vehicle. By virtue of such means being included in automotive vehicles drivers are given warning of the velocity status and of the impending application of brakes in the vehicle ahead. The time elapsed in applying brakes is utilized for signaling to the vehicle behind and this vehicle in turn utilizes such elapsed time for the same purpose with the result that trailing vehicles are given longer advance warning of the application of brakes by the vehicles ahead. While a preferred embodiment of the invention has been shown and described it is to be understood that variations and changes may be resorted to without departing from the ambit of the invention as defined by the appended claims.

What is claimed is:

1. In an automotive vehicle having a braking system which includes an electrical brake circuit having a brake switch and at least one electrical signal lamp in series therewith across the vehicle's battery, said signal lamp emitting a red colored light upon closing of said brake switch upon application of the vehicle's brakes, improved rear end warning means for signaling changes in velocity status of said vehicle to trailing vehicles comprising, in combination, housing means mounted at the rear of said vehicle and housing at least a pair of electrical signal lamps which, upon being energized, are capable of emitting amber and green colored lights, respectively, visible in respect to a trailing vehicle, an energizing warning circuit across the vehicle's battery and in parallel amber said brake circuit for separately energizing said amber and green lamps comprising a pair of parallel electrical paths each consisting of only one type of electrical element which is at least one of said lamps disabling means including, normally closed actuated open switch means in series with the vehicle ignition switch, said brake switch and said normally closed actuated open switch means being distinct electrical elements, and single pole double throw switch means alternately connecting one or the other of said paths in series with said vehicle ignition switch through said normally closed actuated open switch means, said disabling means operable in conjunction with the vehicle brake system to open said normally closed actuated open switch means to break the entire said energizing warning circuit upon actuation of the vehicle brakes, said normally closed actuated open switch means being functionally independent of said single pole double throw switch means but said single pole double throw switch means being functionally dependent upon said normally closed actuated open switch means, said energizing warning circuit being re-activated independently of the position of said single pole double throw switch upon re-closing of said normally closed activated open switch means consequent upon opening of said brake switch upon release of the vehicle brakes.

2. Improved vehicle rear end warning means as claimed in claim 1 including a double pole double throw switch actuated by movement of the vehicle brake pedal, said normally closed actuated open switch means comprising one pole of said double pole switch, the other pole of said double pole switch in series with the vehicle stop lights, said one pole opening and the other closing upon actuation of the vehicle brake pedal to break the entire said energizing warning circuit and to make the stop light circuit.

3. Improved vehicle rear end warning means as claimed in claim 1 including a disabling circuit in parallel with said energizing circuit and said battery comprising electrical means operable in conjunction with actuation of the vehicle brakes to open said normally closed actuated open switch means to break said energizing circuit.

4. Improved vehicle rear end warning means as claimed in claim 3 including an electromagnetic relay, said normally closed actuated open switch means comprising normally closed contacts of said relay, the electromagnet of said relay being in series with the vehicle stop light switch, said normally closed relay contacts being opened upon energization of said electromagnet, said disabling circuit being made upon actuation of the vehicle brakes to energize said electromagnet to break said energizing circuit.

References Cited
UNITED STATES PATENTS

| | | | |
|---|---|---|---|
| 2,513,712 | 7/1950 | Coombs | 340—66 |
| 2,685,048 | 7/1954 | Schweitzer | 340—62 X |
| 2,698,403 | 12/1954 | Woodham | 340—66 X |
| 2,750,578 | 6/1956 | Petrella et al. | 340—66 X |
| 2,751,522 | 6/1956 | Spangenberg | 340—66 X |
| 2,760,113 | 8/1956 | Danek | 340—71 X |
| 2,832,864 | 4/1958 | Rapp | 340—71 X |
| 2,833,880 | 5/1958 | Repkow | 340—71 X |
| 3,320,586 | 5/1967 | Wagner | 340—66 |

JOHN W. CALDWELL, *Primary Examiner.*

A. H. WARING, *Assistant Examiner.*

UNITED STATES PATENT OFFICE
CERTIFICATE OF CORRECTION

Patent No. 3,395,388                        July 30, 1968

Jack R. Hendrickson

It is certified that error appears in the above identified patent and that said Letters Patent are hereby corrected as shown below:

Column 5, line 51, "amber" should read -- with --; line 55, after "lamps" insert a comma; line 56, "including," should read -- including --.

Signed and sealed this 13th day of October 1970.

(SEAL)
Attest:

Edward M. Fletcher, Jr.                  WILLIAM E. SCHUYLER, JR.
Attesting Officer                        Commissioner of Patents